United States Patent [19]

Falkenstein et al.

[11] 4,049,590
[45] Sept. 20, 1977

[54] MANUFACTURE OF POLYURETHANE COMPOSITIONS

[75] Inventors: Georg Falkenstein, Neustast; Dieter Stein, Limburgerhof; Franz Haaf, Bad Duerkheim; Gerhard Heinz, Weisenheim; Ernst Schoen, Ludwigshafen, all of Germany

[73] Assignee: BASF Aktiengesellschaft, Ludwigshafen, Germany

[21] Appl. No.: 634,878

[22] Filed: Nov. 24, 1975

[51] Int. Cl.² .................. C08G 18/04; C08G 18/14
[52] U.S. Cl. .................. 260/2.5 BE; 260/75 NP; 260/77.5 AP; 260/77.5 CR; 260/858; 260/859 R
[58] Field of Search .......... 260/2.5 BE, 858, 859 R, 260/77.5 CR, 77.5 AP, 75 NP

[56] References Cited

U.S. PATENT DOCUMENTS

| | | | |
|---|---|---|---|
| 2,993,013 | 7/1961 | Wolfe, Jr. | 260/2.5 BE |
| 3,024,207 | 3/1962 | Shaw et al. | 260/2.5 BE |
| 3,094,494 | 6/1963 | Hopkins et al. | 260/2.5 BE |
| 3,294,711 | 12/1966 | Von Bonin | 260/2.5 BE |
| 3,523,093 | 8/1970 | Stamberger | 260/2.5 BE |
| 3,607,797 | 9/1971 | Rubens et al. | 260/2.5 BE |
| 3,719,726 | 3/1973 | Hara et al. | 260/859 R |
| 3,755,211 | 8/1973 | Fabris et al. | 260/2.5 BE |
| 3,823,201 | 7/1974 | Pizzini et al. | 260/859 R |
| 3,878,133 | 4/1976 | Rubens | 260/2.5 BE |
| 3,935,132 | 1/1976 | Gerkin et al. | 260/2.5 BE |
| 3,970,717 | 7/1976 | Muller-Albrecht et al. | 260/2.5 BE |

*Primary Examiner*—Eugene C. Rzucidlo
*Attorney, Agent, or Firm*—Keil, Thompson & Shurtleff

[57] ABSTRACT

Polyurethane compositions — which may or may not be foamed — having improved mechanical properties are manufactured from organic polyisocyanates, polyhydroxy compounds and one or more at least partially crosslinked, particulate polymers of particle size from 500 to 5,000 A, of which polymer from 1 to 40% by weight are dispersed in the polyhydroxy compound.

16 Claims, No Drawings

MANUFACTURE OF POLYURETHANE COMPOSITIONS

The present invention relates to a process for the manufacture of polyurethane compositions — which may or may not be foamed — by polyaddition of organic polyisocyanates and polyhydroxy compounds from the group of polyether-polyols and/or polyester-polyols, in the presence of one or more at least partially crosslinked particulate polymers.

It is known to manufacture polyurethane plastics having a variety of physical properties by reacting compounds having a plurality of active hydrogen atoms, in particular polyhydroxy compounds, with polyisocyanates, if desired in the presence of chain extenders, crosslinking agents, blowing agents, activators, emulsifiers and other adjuvants. If the components are suitably chosen, both elastic and rigid foams, surface coatings, impregnations, covering layers and elastomers can be manufactured by this method.

Since, furthermore, in numerous applications the polyhydroxy compounds cannot be employed in the form of solutions, the viscosity of the polymer/polyol mixtures used plays an important role in the manufacture of polyurethane plastics. This is particularly true when manufacturing polyurethane foams, in which case it must be possible to feed, and meter, the polymer/polyol mixture satisfactorily by means of pumps and to mix it, homogeneously and very rapidly, in mixing chambers, with the isocyanate component and the adjuvants, e.g. activators, emulsifiers water and/or blowing agents. For this reason, very low viscosities are desirable when manufacturing polyurethane foams.

If, in the manufacture of polyurethanes, the reactants are mixed unsatisfactorily, because of their high viscosities, the product is inhomogeneous and/or foaming takes place unsatisfactorily, to the detriment of the quality of the products.

It has also been disclosed, in German published application No. 2,249,094, that the load-bearing capacity of flexible polyurethane foams of low density can be increased by adding polymer latices with particle sizes of from 200 to 800 A and having glass transition temperatures above 50° C.

It is true that using this method, the aqueous emulsions of brittle polymers, described in the above German published application, can be used, but even at relatively low concentrations of the polymer in the polyhydroxy compound the viscosity of the mixture increases greatly and therefore these mixtures are difficult to handle since they are no longer free-flowing.

U.S. Pat. No. 3,523,093 discloses that the polymers described therein can no longer be used if they exceed a certain molecular weight, since in that case the viscosity of the polymer/polyol mixture rises to an extent which prevents their use for the manufacture of polyurethanes.

Very viscous polymer/polyol mixtures cannot be used for processing on, e.g., high pressure foaming apparatus.

The above U.S. patent furthermore discloses that the pulverulent reactive polymer must be redispersible in the polyhydroxy compound. This method requires increased efford. After polymerization, the polymer must first be isolated by conventional methods and then be dried. Thereafter, the filler is uniformly distributed in the polyhydroxy compound. Hence, the process involves three stages and demands considerable expenditure of equipment and time. Redispersibility is an important factor with regard to marketability, since polymer/polyol mixtures must prove stable on storage for prolonged periods without even partial macroscopic sedimentation of the dispersed polymer. If this requirement is not met, the metering of the polymer/polyol mixture presents difficulties. Furthermore, uniform distribution of the filler, which is essential for achieving optimum properties of, e.g., a polyurethane foam, can no longer be relied upon. To conform to this requirement, the polymer must be isolated in a very finely divided form. This again entails increased technical effort.

It is an object of the present invention to provide polymer/polyol mixtures which combine good processability with an improvement in polyurethane properties.

It is a further object of the present invention to simplify the introduction of polymer particles into the polyol preferably by mixing aqueous dispersions with the polyol and then entirely or partially abstracting the water from the mixture.

We have found, surprisingly, that this object is achieved by using crosslinked polymers which, in contrast to the corresponding non-crosslinked polymers, give polymer/polyol mixtures which are of low viscosity and are therefore more easily processable.

Surprisingly, this contradicts the teaching of U.S. Pat. No. 3,523,093, since crosslinking in particular gives polymers of very high molecular weight.

We have furthermore found that when using crosslinked polymers the average diameter of the particles in the polymer dispersion used may, in contrast to the teaching of German published application No. 2,249,094, be substantially in excess of 800 A without a detectable lowering of the mechanical properties of the end products.

The present invention relates to a process for the manufacture of polyurethane compositions — which may or may not be foamed — from a mixture of A. one or more organic polyisocyanates,
B. one or more polyhydroxy compounds with a mean molecular weight of from about 500 to 7,000, from the group of the polyether-polyols and polyester-polyols,
C. one or more polymers and, if appropriate,
D. conventional adjuvants and assistants, wherein the polymer (C) is an at least partially crosslinked, particulate polymer of particle size from 500 to 5,000 A, of which polymer from 1 to 40 percent by weight are dispersed in the polyhydroxy compound (B).

It is an essential advantage of the process according to the invention that by using crosslinked polymers the resistance of the polyurethane composition to organic solvents is significantly improved.

It is surprisingly that using the process according to the invention, significant improvements in the mechanical properties of the various polyurethane compositions can also be achieved.

The following are some details relating to the starting materials used in the process according to the invention:

A. The polyisocyanates (A) may be aliphatic or aromatic polyfunctional isocyanates, e.g. alkylenediisocyanates, such as tetramethylenediisocyanate and hexamethylenediisocyanate, arylenediisocyanates and their alkylation products, such as the phenylenediisocyanates, naphthylenediisocyanates, diphenylmethanediisocyanates, toluylenediisocyanates, diisopropylbenzenediisocyanates are triisopropylbenzenediisocyantes, triphenylmethanetriisocyanates, polyphenylpolymethylenepolyisocyanates, tri-(p-isocyanatophenyl) thiophosphate and tri-(p-isocyanatophenyl) phosphate, aralkyldiisocyanates, such as 1-(isocyanatophenyl)-ethylisocyanate or xylylenediisocyanates, and polyisocyanates substituted by a great variety of substituents, e.g. alkoxy, nitro and/or chlorine, as well as polyisocyanates modified with minor amounts of polyhydroxy compounds, such as trimethylolpropane, hexanetriol, glycerol or butanediol. It is further possible to use, e.g., polyisocyanates blocked with phenols or bisulfite, acetal-modified isocyanates and amide-, acylurea- and isocyanurate-modified polyisocyanates.

Preferred isocyanates to use are toluylenediisocyanates, 2,2'-,2,4'- and 4,4'-diphenylmethanediisocyanate and the corresponding isomer mixtures, mixtures of diphenylmethanediisocyanates and polyphenylpolymethylenepolyisocyanates, polyisocyanates modified with polyhydroxy compounds, polyisocyanates containing isocyanurate rings and, particularly, mixtures of toluylenediisocyanates, diphenylmethanediisocyanates and polyphenylpolymethylenepolyisocyanates.

The polyisocyanates (A) are suitably used in amounts corresponding to from 70 to 130%, preferably from 85 to 115%, of the amount required theoretically for reaction with all hydrogen atoms, reactive toward isocyanate groups, which are present in the reaction mixture.

B. The polyhydroxy compounds (B) used in the process of the invention are, e.g., the conventional linear or branched polyesters which are manufactured, e.g., from polybasic, preferably dibasic, carboxylic acids and polyhydric alcohols. Examples of suitable dibasic carboxylic acids are aliphatic dicarboxylic acids, e.g. succinic acid, glutaric acid, adipic acid, suberic acid, azelaic acid, sebacic acid and maleic acid, and aromatic dicarboxylic acids, e.g. phthalic acid, isophthalic acid, halogenated phthalic acids and terephthalic acid. The acids may be used as individual compounds or as mixtures. In manufacturing the polyester-polyols it may at times be advantageous to employ, not the carboxylic acids, but the corresponding carboxylic acid derivatives, e.g. carboxylic acid esters with alcohols of 1 to 4 carbon atoms, carboxylic acid anhydrides or carboxylic acid chlorides. Examples of polyhydric alcohols are glycols, e.g. ethylene glycol, diethylene glycol, 1,4-butanediol, 1,5-pentanediol, 1,6-hexanediol, 1,10-decanediol, 2,2-dimethylpropane-1,3-diol and 2,2,4-trimethylpentane-1,3-diol, triols, e.g. glycerol and trimethylolpropane, and polyols, e.g. pentaerythritol, sorbitol and sucrose. Depending on the desired properties, the polyester-polyols may be used as individual compounds or as mixtures in various ratios.

Suitable polyether-polyols may be manufactured by reacting one or more alkylene oxides of 2 to 4 carbon atoms in the alkylene radical with a starter molecule which contains several chemically bonded active hydrogen atoms. Examples of suitable alkylene oxides are ethylene oxide, 1,2-propylene oxide, epichlorohydrin, 1,2-butylene oxide and 2,3-butylene oxide. The alkylene oxides may be used as individual compounds, or in alternating succession, or as mixtures. Examples of suitable starter molecules are water, phosphoric acid, amines, e.g. ammonia, hydrazine, ethylenediamine, hexamethylenediamine, toluylenediamine, diaminodiphenylmethane and melamine, aminoalcohols, e.g. monoethanolamine and diethanolamine, polycarboxylic acids, e.g. adipic acid and terephthalic acid, and polyhydroxy compounds, e.g. ethylene glycol, propylene glycol, diethylene glycol, glycerol, trimethylolpropane, pentaerythritol, sorbitol and sucrose. The polyetherpolyols may have a straight-chain, partially branched, or branched structure.

Further polyhydroxy compounds (B) which may be used are polymerization products of tetrahydrofuran, and polyacetals, in particular polyoxymethylenes containing hydroxyl groups.

Preferably, polyhydroxy compounds based on linear and branched polyethers obtained from propylene oxide and ethylene oxide are used. Such polyethers are manufactured by conventional methods, e.g. as disclosed in German published application No. 2,220,723, page 4.

The hydroxyl number of the polyols used can vary within a broad range. In general, it is from about 20 or less to about 1,000 or more, preferably from about 20 to about 600 and in particular from about 25 to about 450. The hydroxyl number is defined as the number of mg of potassium hydroxide required for complete hydrolysis of the completely acetylated derivative prepared from 1 g of polyol. The hydroxyl number can also be defined by the following equation:

$$OH = \frac{56.1 \times 1000 \times f}{MW}$$

where:
$OH$ is the hydroxyl number of the polyol,
$f$ is the functionality, i.e. the average number of hydroxyl groups per molecule of polyol and
$MW$ is the molecular weight of the polyol.

The choice of the polyol used depends on the ultimate use of the polyurethane product to be manufactured therefrom. The molecular weight or hydroxyl number is suitably selected to give flexible, semiflexible or rigid foams or elastomers when the polymer/polyol mixture prepared from the polyol is converted to a polyurethane foam or elastomer. The polyols preferably have a hydroxyl number of from about 200 to about 1,000 if they are to be used for rigid foams, a hydroxyl number of from about 50 to about 150 if they are to be used for the manufacture of semi-flexible foams and from about 20 to about 70 or above if they are to be used for the manufacture of flexible foams. However, these limits in no way restrict the present invention and instead merely serve to illustrate the large number of possible combinations of the above polyol co-reactants.

In general, the polyhydroxy compounds (B) are employed in such amounts that the hydroxyl groups of the component (B) are present in amounts which are about equivalent to the isocyanato groups of the component (A), though in order to achieve special properties it may be appropriate to use amounts which are up to about 30% above, or below, the equivalent amounts.

C. Suitable polymers (C) to be used according to the invention are homopolymers and copolymers which contain no groups which can react with isocyanates or, preferably, which contain at least one group which can react with isocyanates, e.g., OH, $NH_2$, NH, COOH, $CONH_2$ and the like, and which, furthermore, are partially crosslinked and have a gel content of not less than 5%, preferably of from 15 to 90% and in particular of from 30 to 80%. The gel content is calculated as follows from the proportion of polymer which is insoluble in the particular solvent, e.g. cyclohexanone:

$$\text{Gel content (\%)} = \frac{\text{Weight of undissolved material (dried)}}{\text{Total weight of polymer}} \times 100$$

These homopolymers and copolymers are manufactured by conventional methods from polymerizable olefinic monomers.

Suitable polymerizable unsaturated compounds for the manufacture of homopolymers and copolymers which do not contain groups which react with isocyanates the monomeric compounds containing one or more polymerizable double bonds. Examples are vinylaromatics, such as styrene, α-alkylated styrenes, e.g. α-methylstyrene, nuclear-substituted styrenes, e.g. vinyltoluene, o-, m- and p-ethylstyrene and tert.-butylstyrene, and halogen-substituted styrenes, e.g. o-chlorostyrene, 2,4-dichlorostyrene and o-bromostyrene, olefinic nitriles, e.g., acrylonitrile and methacrylonitrile, vinyl halides, e.g., vinyl chloride, vinylidene chloride and vinyl bromide, vinyl esters, e.g., vinyl acetate, vinyl propionate and vinyl pivalate, and esters of α- or β-unsaturated carboxylic acids, e.g., esters of acrylic acid, methacrylic acid, itaconic acid, maleic acid, fumaric acid and crotonic acid with aliphatic or cycloaliphatic alcohols of 1 to 10 carbon atoms, e.g., methyl, ethyl, propyl, i-propyl, n-butyl, i-butyl, tert.-butyl, hexenyl, octyl, ethylhexyl and lauryl acrylate and methacrylate. Mixtures of such vinyl compounds may also be used.

However, as already mentioned, homopolymers and copolymers which contain groups which react with isocyanates are preferred. Suitable monomers which contain groups which react with isocyanates and which may be used as the starting material for such homopolymers and copolymers are unsaturated polymerizable alcohols, e.g., vinyl-glycol, but-2-ene-1,4-diol, butenol and/or allyl alcohol, esters of unsaturated carboxylic acids, e.g., acrylic acid or substituted acrylic acids, crotonic acid, fumaric acid and itaconic acid, with straightchain or branched polyhydric alcohols which may contain ether groups, in particular with diols and triols of mean molecular weights from 50 to 6,000, preferably from 50 to 2,000, in which at least one OH group of the polyhydric alcohol is not esterified, unsaturated copolymerizable polyols with mean molecular weights of from 200 to 6,000, preferably from 500 to 2,000, amides of unsaturated carboxylic acids, e.g. acrylamide and methacrylamide, or other derivatives which react with NCO groups and/or unsaturated monocarboxylic acids or dicarboxylic acids, e.g., acrylic acid, methacrylic acid, fumaric acid and the like, or their mixtures.

These monomers containing groups which react with isocyanates may be used either by themselves or as mixtures with the above polymerizable monomers which do not contain reactive groups, for the synthesis of the polymer (C).

In general, the polymer is manufactured by conventional processes, e.g. solution polymerization or suspension polymerization, but preferably emulsion polymerization.

The emulsion polymerization in an aqueous medium is carried out by conventional methods at from 30° to 100° C, in general in the presence of emulsifiers, e.g. alkali metal salts, especially sodium salts of alkylsulfonic acids or alkylarylsulfonic acids, alkyl-sulfuric acids, fatty alcohol-sulfonic acids or fatty acids; preferred emulsifiers are sodium salts of alkylsulfonic acids or fatty acids of 12 to 18 carbon atoms. The emulsifiers are generally used in amounts of from 0.3 to 5, especially of from 1.0 to 2.0, percent by weight, based on the monomers. Where appropriate, conventional buffer salts, e.g. sodium bicarbonate and sodium pyrophosphate, are also present.

Equally, the conventional polymerization initiators may be used, e.g., persulfates or organic peroxides, if appropriate together with reducing agents. The weight ratio of water to monomer is preferably from 2:1 to 0.7:1. The polymerization is preferably taken to almost complete conversion, i.e., to more than 90%, and in particular more than 96%, conversion of the monomers.

The size of the latex particles may be varied by conventional methods, e.g., seeding, variation of emulsifier concentration, addition of the emulsifier in stages, liquor ratio, (rate of) addition of emulsion and addition of agglomerating agents. The particle size (i.e., diameter) may be from 500 to 5,000 A. However, polymers with a mean particle size ($d_{50}$ value of the weight distribution) of from 1,000 to 2,500 A are preferred; this mean value may be determined by counting from electron microphotographs, or by ultracentrifuge measurements. The "$d_{50}$ value" represents a value such that 50%, by weight, of the polymer particles have a diameter above this value and 50%, by weight, of the polymer particles have a diameter below this value. The breadth of the weight distribution of the dispersed polymer particles may vary within wide limits, but polymer dispersions in which at least 20% by weight, and preferably from 30 to 70% by weight, of the polymer particles have diameters of from 1,000 to 2,500 A are preferred.

The crosslinking which is an essential feature of the invention may be brought about by introducing up to about 20% by weight, preferably from 0.1 to 18% by weight, and especially from 1 to 10% by weight, of a crosslinking agent in the course of polymerizing the monomers. Alternatively, the crosslinking may be effected subsequent to the manufacture of the polymer, by heating, addition of peroxides or other crosslinking agents, or irradiation. Suitable crosslinking agents which may be copolymerized with monoolefinic monomers are, e.g., divinylbenzene, diallyl maleate, diallyl fumarate, diallyl adipate, allyl acrylate, allyl methacrylate, diacrylates and dimethacrylates of polyhydroxyalcohols, e.g., ethylene glycol dimethacrylate, and other poly-olefinically unsaturated monomers. Divinylbenzene is the preferred crosslinking agent.

In order to achieve the desired effect of improving the loadbearing capacity of foamed polyurethane compositions, the composition of polymer (C) is so chosen that the polymer has a glass transition temerature of at least 40° C, preferably from 50° C to 130° C.

In order to achieve special properties, e.g. for applications which demand high elasticity even at low temperatures, coupled with improved load-bearing capacity, graft polymers having two glass transition temperatures, one below −20° C, preferably at from −40° C to −90° C, and the other above +40° C, preferably at from 50° to 130° C, are used.

The graft copolymers are manufactured by polymerizing grafting monomers in the presence of the previously formed rubber backbone, in general using conventional graft polymerization methods. In such reactions, the monomers are generally added to the previously formed rubber backbone and this mixture is polymerized in order chemically to bind, or graft, at least a part of the copolymer onto the rubber backbone.

The weight ratio of the graft backbone to the grafted-on monomer may be from 90:10 to 10:90 and preferably from 80:20 to 40:60.

Various crosslinkable rubbers onto which the copolymer can be grafted may be used as the backbone of the graft copolymer; they include diene rubbers, acrylate rubbers, polyisoprene rubbers and mixtures thereof.

The preferred rubbers are diene rubbers or mixtures of diene rubbers, i.e., all rubbery polymers (i.e., polymers having glass transition temperatures not above −20° C, according to ASTM test D-746–52 T) of one or more conjugated 1,3-dienes, e.g., butadiene, isoprene, piperylene, chloroprene and the like. Such rubbers include homopolymers of conjugated 1,3-dienes and copolymers of these 1,3-dienes with up to equal amounts by weight of one or more copolymerizable monoethylenic monomers.

The grafting monomers used may be the monomers mentioned above, of which the homopolymers have a glass transition temperature above +40° C.

For special applications it is entirely possible to use mixtures of graft polymers and polymers with glass transition temperatures above 40° C.

The graft polymers to be used according to the invention also have a gel content of more than 30%, preferably from 30 to 90% and especially from 50 to 80%.

The polymer (C) to be used according to the invention is employed in amounts of from 1 to 40 percent by weight, preferably from 5 to 20 percent by weight, based on the polyhydroxy compound (B).

The preferred method of introducing the polymer (C) into the polyhydroxy compound and uniformly distributing it therein is to mix the preferably aqueous polymer dispersion with the polyhydroxy compound in conventional apparatuses which permit thorough mixing, such as continuous or batchwise mixers, e.g., stirred vessels or ISG mixers. Thereafter, the water and/or other dispersion medium is removed, at least partially, by the use of conventional physical methods of separation, e.g., at elevated temperatures and/or under reduced pressure.

D. Assistants and adjuvants (D) which may be used in the process according to the invention are chain extenders, crosslinking agents, blowing agents or other assistants, e.g., activators, emulsifiers, stabilizers, dyes, fillers, flame-proofing agents and the like. If the product is to be foamed, water and/or other blowing agents, e.g., azo compounds, low-boiling hydrocarbons, halogenated methanes or ethanes or vinylidene chloride, may be used. The reaction may be carried out in the presence of catalysts, e.g., amines such as triethylamine, dimethylbenzylamine, 1-dimethylamino-3-ethoxypropane, tetramethyl-ethylenediamine, N-alkylmorpholine and triethylenediamine and/or metal salts, e.g. tin-(II) acylates, dialkyl-tin-(IV) acylates, acetylacetonates of heavy metals, molybdenum glycolate.

Examples of emulsifiers to be mentioned are oxyethylated phenols or diphenols, higher sulfonic acids, sulfuric acid esters of castor oil or ricinoleic acid and ammonium salts of oleic acid, whilst examples of foam stabilizers are those containing siloxane and alkylene oxide units, as well as basic silicone oils.

Further detals relating to the above conventional adjuvants and assistants (D) are to be found in the specialist literature, e.g., in the book by Saunders and Frisch, "High Polymers, Polyurethanes", volumes 1 and 2 (1967).

We have found, surprisingly, that on removing the water from mixtures of polyols and emulsions of graft polymers, stable dispersions are obtained, whilst if non-grafted rubber emulsions are used, a macroscopic phase separation takes place.

If the polymer/polyol mixtures (C)/(B) described above are used, in accordance with the invention, to manufacture polyurethane plastics, products having particularly advantageous properties are The addition of such polymers results in an improvement in the tensile strength measured according to DIN 53,571 and of the tear resistance and permanent set, measured according to DIN 53,572, of the polyurethane foams.

In addition to these properties of great practical importance, the addition of such polymers may be used, whilst keeping the density of the product (measured according to DIN 53,420) constant, in order substantially to increase the indentation hardness (measured according to DIN 53,577) of cellular flexible polyurethane compositions and foams.

This improvement in properties offers both commercial and technological advantages in the manufacture of foams used for cushioning, e.g., for automobile seats, upholstered furniture and the like. However, the indentation hardness of soft foams of high density, such as are used, e.g., in polyurethane crash pads and fenders, e.g. in automotive construction, may also be improved substantially.

In addition, an increase in the compression ratio (the ratio of the identation hardness at 60% compression to that at 20% compression) may be achieved by adding the above polymers. This results in gradual compressive behavior, i.e. soft resilience under low compressive load but substantially increased load-bearing capacity at greater compression. This gradual compressive pattern is not only important for cushioning foams, but also a desirable feature in foams of high density, used, e.g., in fenders in automotive construction, shoe soles and similar applications.

Equally, the compression ratio for conventional hot block foams, which is about 2, can be increased significantly by adding such polymers, so that hot block foams of improved compression characteristics may be obtained by this method.

If graft polymers having two glass transition temperatures, obtained by grafting a hard polymer with a glass transition temperature of above 40° C onto a polymer having a glass transiton temperature below 20° C, are employed, an improvement in the low-temperature strength is achieved in addition to the advantages described above. This means that at low use temperatures the polyurethane composition — which may or may not be foamed — remains flexible. The retention of flexibility at low use temperature is particularly desirable in the case of surface coatings, elastomers and foams, e.g. for applications in automotive construction, the manufacture of shoes, shoe soles and numerous other applications.

The parts and percentages mentioned in the Examples are by weight.

EXAMPLES 1 AND 2, AND COMPARATIVE EXAMPLES a. Manufacture of the polystyrene and 80:20 styrene/acrylonitrile copolymer dispersions 150 parts of desalinated water, 0.5 part of sodium alkylsulfonate, e.g. Mersolat K 30, and 0.2 part of sodium pyrophosphate are first introduced into a stirred kettle, under notrogen. The mixture is heated to 80° C and 0.1 part of potassium persulfate and 10 parts of styrene monomer or of an 80:20 mixture of styrene monomer and acrylonitrile are then added. 90 parts of styrene monomer or of the 80:20 mixture of styrene monomer and acrylonitrile are run in over 2 hours, and the polymerization is then continued for a further hour.

Identical batches are polymerized by the same method, but introducing a regulator (0.6 part of tert.-dodecyl mercaptan) or crosslinking agent (2 parts of divinylbenzene) in the monomer run in. (b) Manufacture of a mixture of the above polymer with a polyetherpolyol based on trimethylolpropane, propylene oxide and ethylene oxide (mean molecular weight 4,800; OH number about 35):

100 parts of the polyether-polyol are mixed, in a stirred vessel, with 25 parts of the above dispersions and the water is then removed almost completely on a thin film evaporator at 60° C and 5 mm Hg.

c. The viscosity of the mixtures was measured on a Brookfield viscometer at 23° C and 50 rpm; the results are shown in the Table which follows:

The polyurethane foams have the following properties:

| Polymer | 1 A | 1 B | 1 C according to the invention | 2 A | 2 B | 2 C according to the invention |
|---|---|---|---|---|---|---|
| Density (kg/m³) (DIN 53,420) | 42.9 | 41.9 | 49.0 | 50.2 | 50.2 | 50.0 |
| Tensile strength (kp/cm²) (DIN 53,571) | 0.7 | 1.47 | 1.60 | 0.85 | 1.20 | 1.50 |
| Elongation at break (%) (DIN 53,571) | 95 | 143 | 155 | 120 | 131 | 147 |
| Compressive strength (p/cm²) (DIN 53,577) | | | | | | |
| 20% compression | 21 | 24 | 27 | 34 | 32 | 36 |
| 40% compression | 35 | 37 | 41 | 48 | 50 | 53 |
| 60% compression | 53 | 70 | 79 | 83 | 85 | 91 |
| Compression ratio | 2.52 | 2.91 | 2.92 | 2.44 | 2.66 | 2.53 |

Thus the polyurethane foams manufactured according to the invention exhibit significantly improved mechanical properties.

EXAMPLE 3 a. 150 parts of water, 1.2 parts of the sodium salt of a paraffinisulfonic acid of 12 to 18 carbon atoms, 0.3 part of potassium persulfate, 0.3 part of sodium bicarbonate and 0.15 part of sodium pyrophosphate were introduced into a V2A steel kettle designed for 10 atmospheres gauge pressure and equipped with a paddle stirrer; to remove the oxygen, the kettle was flushed twice with nitrogen and the solution was then heated to 65° C under nitrogen. 0.5 part of tert.-dodecyl mercaptan and 16.7 parts of butadiene were then introduced into the solution. One hour after the start of the polymerization, the addition of a further 83.3 parts of butadiene in the course of 5 hours was started. After a total reaction time of 19 hours, the conversion was 96% and a polybutadiene emulsion having a solids content of 39.2%, based on emulsion, was obtained. The polybutadiene obtained from the latex had a glass transition temperature of

TABLE

| Polymer | 1 A | 1 B | 1 C according to the invention | 2 A | 2 B | 2 C according to the invention |
|---|---|---|---|---|---|---|
| Styrene | 100 | 100 | 100 | 80 | 80 | 80 |
| Acrylonitrile | — | — | — | 20 | 20 | 20 |
| tert.-Dodecyl mercaptan | 0.6 | — | — | 0.6 | — | — |
| Divinylbenzene | — | — | 2 | — | — | 2 |
| K value * (determined by the method of H. Fikentscher) | 37.6 | 81.2 | — | 43.9 | 107 | — |
| Gel content * | — | — | 58% | — | — | 69% |
| Brookfield viscosity (cp) (23° C/50 rpm) | 19,000 | 11,000 | 6,000 | 7,700 | 6,400 | 4,800 |

*measured in cyclohexanone d. Manufacture of the soft polyurethane foams, and tests thereon:

110 parts of a polymer/polyol mixture containing 10 parts of polymers 1 A to 2 C and 100 parts of a polyether-polyol based on trimethylolpropane, propylene oxide and ethylene oxide, the mixture having an OH number of 32, 2.8 parts of water, 1.2 parts of silicone foam stabilizer, 0.08 parts of diazo-bicyclo-2,2,2-octane, 0.5 part of N-ethylmorpholine, 0.03 part of dibutyl-tin dilaurate, 0.08 part of Niax A 1 (a solution of 2,2'-dimethylaminodiethyl ether) as the catalyst, and 36.2 parts of a mixture of 80 parts of toluylenediisocyanate, comprising 80% of the 2,4-isomer and 20% of the 2,6-isomer, and 20 parts of a mixture of diphenylmethanediisocyanates and polyphenylpolymethylenepolyisocyanates are mixed in the mixing chamber of a commercial foaming apparatus and introduced into a closed aluminum mold in which the mixture foams up.

about 80°0 C. The emulsion was diluted with 100 parts of water, heated to 70° C and mixed, at this temperature, with 0.13 part of potassium persulfate (in the form of a three percent strength aqueous solution) and with 11 parts of a mixture of styrene and acrylonitrile. The weight ratio of styrene to acrylonitrile in this mixture was 7:3. 10 minutes after starting the grafting reaction, the addition of a mixture of a further 39 parts of styrene and 17 parts of acrylonitrile in the course of 2 3/4 hours was started. The reaction temperature assumed a value of 75° C. When all the monomer had been added, the reaction was continued for a further hour.

b. 10 parts (based on solids) of the aqueous emulsion thus obtained and 100 parts of a polyether-polyol based on trimethylolpropane, propylene oxide and ethylene oxide and having a mean molecular weight of about 4,800 and an OH number of 35 are mixed at about 40° C and the water is then removed almost completely, under reduced pressure. The viscosity of the polymer/polyol mixture was about 3,000 cp (measured on a Brookfield viscometer at 50 rpm and 23° C). Manufacture of a foam, and tests thereon:

a. 100 parts of a polymer/polyol mixture of 10 parts of the above graft polymer and 90 parts of a polyether-polyol based on trimethylolpropane, propylene oxide and ethylene oxide, the OH number of the mixture being 32, 10 parts of 1,4-butanediol, 0.02 part of diazabicyclo-2,2-octane and 6 parts of fluorotrichloromethane are mixed with 47 parts of a prepolymer based on 4,4'-diphenylmethanediisocyanate and a polyalkylene oxide and having an NCO content of 23.3%, and the mixture is foamed in a closed mold.

b. The mixture is as under (a), but using only 90 parts of polyol, without graft polymer.

The cellular polyurethane has the following properties:

When this temperature has been reached, 0.1 part of potassium persulfate and 1/5 of a preemulsified mixture of 100 parts of the monomer mixture, 100 parts of desalinated water, 0.5 part of Mersolat K 30 and, optionally, a regulator or crosslinking agent, are added. When the polymerization has started, the remaining 4/5 of the pre-emulsified mixture are added in the course of 2 hours and the polymerization is then continued for a further hour. The Table given in (c) shows the composition of the copolymers and the regulators or crosslinking agents used in the polymerization.

b. Manufacture of the mixtures with a polyether-polyol 100 parts of a polyether-polyol based on trimethylolpropane, propylene oxide and ethylene oxide, and having a mean molecular weight of 4,800 and an OH number of 35, are mixed with 25 parts of the emulsion manufactured according to (a) in a stirred vessel and the water is then removed completely under reduced pressure.

C. The viscosities of the mixtures were measured on a Brookfield viscometer at 23° C and 50 rpm. The results are summarized in the Table which follows:

| Polymer | 4 A | 4 B | 4 C | 5 B | 5 C | 6 B | 6 C |
|---|---|---|---|---|---|---|---|
| Styrene | 95 | 95 | 95 | 95 | 95 | 67 | 67 |
| Acrylonitrile | — | — | — | — | — | 28 | 28 |
| Hydroxypropyl acrylate | 5 | 5 | 5 | — | — | — | — |
| Butanediol monoacrylate | — | — | — | 5 | 5 | — | — |
| Reaction product L | — | — | — | — | — | 5 | 5 |
| tert.-dodecyl mercaptan (%, based on total monomers) | 0.6 | — | — | — | — | — | — |
| Divinylbenzene (%, based on total monomers) | — | — | 2 | — | 2 | — | 2 |
| K value (measured by the Fikentsher method) in cyclohexanone | 40.5 | 77.1 | | 72.7 | | 65.2 | |
| Gel content (measured in cyclohexanone) | — | — | 78% | — | 71% | — | 37% |
| Brookfield viscosity, cP (23° C/50 rpm) | 13,000 | 4,400 | 1,800 | 6,300 | 1,890 | 13,400 | 2,100 |

"Reaction product L" is a reaction product of 1 mole of maleic anhydride and 1 mole of a polyether-polyol based on polypropylene glycol and having a mean molecular weight of 2,000.

|  | (a) with polymer according to the invention | (b) without polymer |
|---|---|---|
| Density (kg/m$^3$) (DIN 53,420) | 600 | 600 |
| Shore hardness A (DIN 53,505) | | |
| at +20° C | 64 | 62 |
| at −20° C | 68 | 72 |
| at −40° C | 69 | 85 |

The polyurethane manufactured according to the invention thus substantially retains its flexibility even at low temperatures.

EXAMPLES 4 TO 6 a. Manufacture of the copolymer dispersions

A mixture of 50 parts of water and 0.5 part of Na alkylsulfonate, e.g. Mersolat K 30, is introduced, under nitrogen, into an autoclave equipped with feed vessels and a paddle stirrer, and is heated therein to 80° C.

d. Manufacture of the soft polyurethane foams, and tests thereon:

110 parts of a polymer/polyol mixture containing 10 parts of polymers 4 A to 6 C and 100 parts of a polyester-polyol based on trimethylolpropane, propylene oxide and ethylene oxide, the mixture having an OH number of 32, 2.8 parts of water, 1.2 parts of silicone foam stabilizer, 0.08 part of diazo-bicyclo-2,2,2-octane, 0.5 part of N-ethylmorpholine, 0.3 part of dibutyl-tin dilaurate, 0.08 part of Niax A 1 (a solution of 2,2'-dimethylaminodiethyl ether) as the catalyst, and 36.2 parts of a mixture of 80 parts of toluylenediisocyanate, comprising 80% of the 2,4-isomer and 20% of the 2,6-isomer, and 20 parts of a mixture of diphenylmethanediisocyanates and polyphenylpolymethylenepolyisocyanates are mixed in the mixing chamber of a commercial foaming apparatus and introduced into a closed aluminum mold, in which the mixture foams up.

| Polymer | 4 A | 4 B | 4 C+ | 5 B | 5 C+ | 6 B | 6 C+ |
|---|---|---|---|---|---|---|---|
| Density (kg/m$^3$) (DIN 53,420) | 50 | 50 | 50 | 50 | 50 | 39.5 | 39.5 |
| Tensile strength (kp/cm$^2$) (DIN 53,571) | 0.9 | 1.25 | 1.65 | 1.06 | 1.42 | 1.04 | 1.53 |
| Elongation at break (%) (DIN 53,571) | 110 | 121 | 157 | 116 | 143 | 166 | 180 |
| Compressive strength (p/cm$^2$) (DIN 53,577) | | | | | | | |
| 20% compression | 29 | 31 | 40 | 30 | 42 | 9 | 25 |
| 40% compression | 41 | 45 | 58 | 43 | 57 | 17 | 36 |
| 60% compression | 77 | 82 | 110 | 79 | 98 | 36 | 65 |
| Tear resistance | | | | | | | |

-continued

| Polymer | 4 A | 4 B | 4 C+ | 5 B | 5 C+ | 6 B | 6 C+ |
|---|---|---|---|---|---|---|---|
| (kp/cm) (DIN 53,575) | 0.28 | 0.49 | 0.89 | 0.40 | 0.52 | 0.64 | 0.75 |

+ = according to the invention
Thus the polyurethane foams manufactured according to the invention exhibit significantly improved mechanical properties.

EXAMPLE 7 a. The following products were first introduced into a V2A steel kettle, designed for 10 atmospheres gauge pressure and equipped with a paddle stirrer:

150 parts of water, 1.2 parts of the sodium salt of a paraffinsulfonic acid of 12 to 18 carbon atoms, 0.3 parts of potassium persulfate, 0.3 part of sodium bicarbonate and 0.15 part of sodium pyrophosphate.

To remove the oxygen, the kettle was flushed twice with nitrogen and the solution was then heated to 65° C in a nitrogen atmosphere. 0.5 part of tert.-dodecyl mercaptan and 16.7 parts of butadiene were then introduced into the solution. Beginning one hour after the start of the polymerization, a further 83.3 parts of butadiene were added in the course of 5 hours. After a total reaction time of 19 hours, the conversion was 96% and a polybutadiene emulsion having a solids content of 39.2%, based on emulsion, was obtained. The polybutadiene latex had a glass transition temperature of about −80° C.

The polybutadiene emulsion thus obtained was diluted with 100 parts of water and heated to 70° C, and at this temperature 0.13 part of potassium persulfate (in the form of a 3% strength aqueous solution) and 11 parts of a mixture of styrene and acrylonitrile were added. The weight ratio of styrene to acrylonitrile in this mixture was 7:3. Beginning 10 minutes after the start of the grafting reaction, a mixture of a further 38 parts of styrene, 16 parts of acrylonitrile and 2 parts of hydroxypropyl acrylate was metered in over 2¾ hours. In the course thereof, the reaction temperature assumed a value of 75° C. After all the monomer had been added, the reaction was continued for a further hour.

b. 10 parts (based on solids) of the aqueous emulsion thus obtained are mixed, at about 40° C, with 100 parts of a polyether-polyol based on trimethylolpropane, propylene oxide and ethylene oxide and having a mean molecular weight of about 4,800 and an OH number of 35, and thereafter the water is removed virtually completely under reduced pressure. The viscosity of the polymer/polyol mixture was bout 2,500 (measured on a Brookfield viscometer at 50 rpm and 23° C).

c. Manufacture of the foam:

1. 100 parts of a polymer/polyol mixture of 10 parts of the above graft polymer and 90 parts of a polyether-polyol based on trimethylolpropane, the mixture having an OH number of 32, 10 parts of 1,4-butanediol, 0.02 part of diaza-bicyclo-2,2,2-octane and 6 parts of monofluorotrichloromethane, and 47 parts of a prepolymer having an NCO content of 23.3% and based on 4,4′-diphenylmethanediisocyanate and a polyalkylene oxide, are foamed in a closed aluminum mold.

2. The mixture used is as under (1), but with only 90 parts of polyether-polyol, without graft polymer.

The cellular polyurethane has the following properties:

| | 1) with polymer (c) (according to the invention) | 2) without polymer (c) |
|---|---|---|
| Density (kg/m³) (DIN 53,420) | 600 | 600 |
| Shore hardness A (DIN 53,505) | | |
| at +20° C | 66 | 63 |
| at −20° C | 68 | 72 |
| at −40° C | 70 | 85 |

The polyurethane manufactured according to the invention thus substantially retains its flexibility even at low temperatures.

EXAMPLE 8 A AND COMPARATIVE EXAMPLE 8 B

If a procedure analogous to that described for Example 4 C and 4 A is used, but with different emulsifier concentrations, the following copolymer latices are obtained:

| Example | Na alkylsulfonate (Mersolat K 30) % by weight Initially added | Subsequently run in | Gel content | Particle size distribution (A) $d_{10}$ | $d_{50}$ | $d_{90}$ |
|---|---|---|---|---|---|---|
| 4 C | 0.5 | 0.5 | 78 | 1,000 | 1,230 | 1,560 |
| 8 A | 1.0 | 1.0 | 76.5 | 720 | 880 | 990 |
| Comparative Example 8 B | 2.5 | 2.5 | 73.1 | 310 | 420 | 550 |

The mixture with the polyether-polyol was prepared analogously to 4 b, and the polyurethane foam was produced analogously to Example 4 d. The following test results are obtained:

A comparison of Example 8 A with Comparative Example 8 B shows that in the presence of crosslinked polymer particles of size less than 500 A polyurethane foams are not obtained.

| | Polymer according to Ex. | | Comparative Ex. |
|---|---|---|---|
| | 4 C | 8 A | 8 B |
| Viscosity (cP) | 1,800 | 2,700 | 2,600 |
| Density (kg/m³) (DIN 53,420) | 50 | 50 | collapse |
| Tensile strength (kp/cm²) (DIN 53,571) | 1.65 | 1.78 | collapse |
| Elongation at break (%) (DIn 53,571) | 157 | 158 | collapse |
| Compressive strength (p/cm²) (DIN 53,577) | | | |
| 20% compression | 40 | 38 | collapse |
| 40% compression | 58 | 54 | collapse |

-continued

|  | Polymer according to Ex. | | Comparative Ex. |
| --- | --- | --- | --- |
|  | 4 C | 8 A | 8 B |
| 60% compression | 110 | 92 | collapse |

EXAMPLE 9 a. Manufacture of the copolymer

In a stirred kettle, 1 part of a dispersion manufactured according to Example 4 C is diluted with 145 parts of water and heated to 85° C, after which 20 parts of a monomer mixture of 18.5 parts of styrene, 1 part of hydroxypropyl acrylate, 0.5 part of divinylbenzene and 0.05 part of potassium persulfate are added. After the polymerization has started (after about 20 minutes), 80 parts of the monomer mixture and 0.1 part of potassium persulfate, 1 part of Mersolat K 30 and 5 parts of water are run in as two separate streams in the course of 3 hours. The reaction mixture is then polymerized for a further 2 hours. After completion of the polymerization, a latex having a solids content of 39.5% and an average particle size ($d_{50}$ value of the weight distribution) of 4,100 A is obtained. The gel content (at 1% strength in cyclohexanone) is 78.6% and the swelling index if 5.6.

The mixture with the polyether-polyol was prepared analogously to 4 b, and the foam was produced analogously to Example 4 b. The following test results were obtained:

| Viscosity (cP) | 1,350 |
| --- | --- |
| Density (kg/m$^3$) (DIN 53,420) | 50 |
| Tensile strength (kp/cm$^2$) (DIN 53,571) | 1.78 |
| Elongation at break (%) (DIN 53,571) | 147 |
| Compressive strength (p/cm$^2$) (DIN 53,577) | |
| 20% compression | 41 |
| 40% compression | 57 |
| 60% compression | 98 |

EXAMPLE 10 a. Manufacture of the copolymer

The copolymer is manufactured analogously to Example 9 except that in place of 145 parts of water, 60 parts were used, and instead of 1 part of Mersolat K 30, 1.5 parts were used. This method gives a latex with a broad particle size distribution. The weight distribution is:

$d_{10}$ 1,690 A; $d_{50}$ 2,350 A; $d_{90}$ 4,720 A;. The solids content is 59.6%.

b. Manufacture of the mixture with the polyether-polyol

A polyether-polyol based on trimethylolpropane, propylene oxide and ethylene oxide, and having a mean molecular weight of about 4,800 and a hydroxyl number of 35 is mixed, in a stirred vessel, with the emulsion prepared according to (a), in a ratio such that after removing the water, under reduced pressure, a mixture of 100 parts of polyether-polyol and 8 parts of polymer is obtained. The hydroxyl number of the mixture was 33.

c. Manufacture of the polyurethane foam, and tests thereon

The foam was manufactured analogously to Example 4 d, with 108 parts of the above polyether-polyool/- polymer mixture. Tests on the foam gave the following results:

| Viscosity (cP) | 1,420 |
| --- | --- |
| Density (kg/m$^3$) (DIN 53,420) | 48.9 |
| Tensile strength (kp/cm$^2$) (DIN 53,571) | 1.76 |
| Elongation at break (%) (DIN 53,571) | 158 |
| Compressive strength (p/cm$^2$) (DIN 53,577) | |
| 20% compression | 33 |
| 40% compression | 45 |
| 60% compression | 78 |
| Tear resistance (kp/cm) (DIN 53,575) | 0.64 |

EXAMPLE 11

A mixture of 100 parts of a polyether-polyol based on trimethylolpropane, propylene oxide and ethylene oxide, and having a mean molecular weight of 6,200 and a hydroxyl number of 27, and 8 parts of a polymer which as manufactured analogously to Example 4 C and 4 a, is foamed analogously to Example 4 d. For comparison purposes, a polyurethane foam without added polymer was manufactured. The test results obtained are summarized in the Table wich follows:

|  | Ex. 11 | Comparative Example without added polymer |
| --- | --- | --- |
| Density (kg/m$^3$) (DIN 53,420) | 48.1 | 48.5 |
| Tensile strength (kp/cm$^2$) (DIN 53,571) | 1.93 | 1.66 |
| Elongation at break (%) (DIN 53,571) | 172 | 228 |
| Compressive strength (p/cm$^2$) (DIN 53,577) | | |
| 20% compression | 26 | 18 |
| 40% compression | 38 | 28 |
| 60% compression | 65 | 47 |

EXAMPLE 12

100 parts of a polymer/polyether-polyol mixture of 8 parts of a polymer, manufactured according to Example 4 C and 4 a, and 92 parts of a polyether-polyol based on trimethylolpropane, propylene oxide and ethylene oxide, the mixture having a hydroxyl number of 32, 1.84 parts of an alkylenediamine/propylene oxide adduct of molecular weight about 500, 2.94 parts of water, 0.41 part of diaza-bicyclo-2,2,2-octane, 0.82 part of dimethylbenzylamine and 54 parts of a mixture of diphenylmethanediisocyanate and polyphenolpolymethylenepolyisocyanate are mixed in the mixing chamber of a commercial foaming apparatus and introduced into a closed aluminum mold, in which the mixture foams up.

In a parallel experiment, a polyurethane foam was manufactured from the same starting components, but without added polymer.

Tests on the foams gave the following results:

|  | Ex. 12 | Comparative Example without added polymer |
| --- | --- | --- |
| Density (kg/m$^3$) (DIN 53,420) | 47.9 | 40.6 |
| Tensile strength (kp/cm$^2$) (DIN 53,571) | 1.30 | 0.69 |
| Elongation at break (%) (DIN 53,571) | 50 | 51 |
| Compressive strength (p/cm$^2$) (DIN 53,577) | | |
| 20% compression | 42 | 16 |
| 40% compression | 63 | 24 |
| 60% compression | 124 | 44 |

-continued

| | Ex. 12 | Comparative Example without added polymer |
|---|---|---|
| Tear resistance (kp/cm) (DIN 53,575) | 0.33 | 0.17 |

EXAMPLE 13

100 parts of a polymer/polyether-polyol mixture of 8 parts of a polymer, manufactured according to Example 4 C and 4 a, and 92 parts of a polyether-polyol based on trimethylolpropane, propylene oxide and ethylene oxide, the mixture having a hydroxyl number of 32, 1.8 parts of water, 0.18 part of diaza-bicyclo-2,2,2-octane, 0.092 part of a polyoxypropylene-siloxane copolymer, 0.138 part of tin-II octoate, 4.6 parts of monofluorotrichloromethane and 24.6 parts of toluylenediisocyanate, consisting of 80% of the 2,4-isomer and 20% of the 2,6-isomer, are mixed in the mixing chamber of a commercial foaming apparatus and introduced into a closed aluminum mold, in which the mixture foams up.

In a parallel experiment, a polyurethane foam was manufactured from the same starting components, but without added polymer.

The foams had the following mechanical properties:

| | Ex. 13 | Comparative Example without added polymer |
|---|---|---|
| Density (kg/m$^3$) (DIN 53,420) | 38.2 | 38.0 |
| Tensile strength (kp/cm$^2$) (DIN 53,571) | 0.82 | 0.71 |
| Elongation at break (%) (DIN 53,571) | 127 | 126 |
| Compressive strength (p/cm$^2$) (DIN 53,577) | | |
| 20% compression | 25 | 20 |
| 40% compression | 35 | 25 |
| 60% compression | 58 | 40 |
| Tear resistance (kp/cm) (DIN 53,575) | 0.46 | 0.38 |

EXAMPLE 14

92.7 parts of a polymer/polyether-polyol mixture of 9.3 parts of a polymer, manufactured according to Example 4 C and 4 a, and 83.4 parts of a polyether-polyol based on trimethylolpropane, propylene oxide and ethylene oxide, the mixture having a hydroxyl number of 32, 3 parts of an alkylenediamine/propylene oxide adduct having a molecular weight of about 500, 3 parts of water, 1.15 parts of a catalyst mixture of diaza-bicyclo-2,2,2-octane and a mixture of linear tertiary amines, 0.2 part of a stabilizer based on an adduct of a siloxane and propylene oxide, and 48 parts of a prepolymer, having an NCO content of 39% by weight and manufactured from a mix of a crude mixture of diphenylmethanediisocyanates and polyphenylpolymethylenepolyisocyanates and crude toluylenediisocyanate and a polyether-polyol having a mean molecular weight of 1,000, are mixed in the mixing chamber of a commercial foaming apparatus and introduced into a closed aluminum mold, in which the mixture foams up.

In a parallel experiment, a polyurethane foam was manufactured from the same starting components, but without added polymer.

The foams had the following mechanical properties:

| | Ex. 14 | Comparative Example without added polymer |
|---|---|---|
| Density (kg/m$^3$) (DIN 53,420) | 48.5 | 48.8 |
| Tensile strength (kp/cm$^2$) (DIN 53,571) | 2.03 | 1.73 |
| Elongation at break (%) (DIN 53,571) | 110 | 128 |
| Compressive strength (p/cm$^2$) | | |
| 20% compression | 49 | 33 |
| 40% compression | 66 | 46 |
| 60% compression | 111 | 79 |
| Tear resistance (kp/cm) (DIN 53,575) | 0.48 | 0.38 |

EXAMPLE 15 a. A monomer mixture of 39 parts of vinyl chloride and 1 part of pentaerythritol triallyl ether was polymerized in the presence of 60 parts of desalinated water, 0.4 part of Mersolat K 30, 0.2 part of stearyl alcohol, 0.08 part of potassium persulfate, 0.04 part of sodium pyrophosphate and 0.04 part of trisodium phosphate, at 50° C in a stirred autoclave, with exclusion of oxygen, until the pressure dropped. After removing the residual monomer, a latex with the following characteristics was obtained: solids content 38.4%, particle size $d_{50}$ 1,500 A, gel content 8%.

b. Manufacture of the mixture with a polyether-polyol 100 parts of a polyether-polyol based on trimethylolpropane, propylene oxide and ethylene oxide, and having a mean molecular weight of 4,800 and an OH number of 35, are mixed with 25 parts of the emulsion manufactured according to (a), in a stirred vessel, and the water is then removed completely under reduced pressure. The polymer had a Brookfield viscosity (23° C/50 rpm) of 3,650 cP.

The foam is manufactured analogously to Example 4 d, using 110 parts of the polyether-polyol/polymer mixture described under (b). The foam obtained had the following properties:

| | |
|---|---|
| Density (kg/m$^3$) (DIN 53,420) | 44.4 |
| Tensile strength (kp/cm$^2$) (DIN 53,571) | 1.36 |
| Elongation at break (%) (DIN 53,571) | 144 |
| Compressive strength (p/cm$^2$) (DIN 53,577) | |
| 20% compression | 26 |
| 40% compression | 37 |
| 60% compression | 65 |

We claim:
1. A method for the manufacture of polyurethanes which comprises:
   I. mixing
   1. a polyhydroxy compound (B) having a molecular weight of from about 500 to 7000 and a hydroxyl number of from 20 to 1000 and selected from the group consisting of polyether-polyols and polyester-polyols, with
   2. an aqueous polymer dispersion containing a crosslinked particulate polymer (C) having a particle size of from 500 to 5000 A and a gel content of not less than 5% and comprising homopolymers, copolymers, graft polymers or mixtures thereof, said crosslinked polymer (C) being obtained by the emulsion or suspension polymerization of
      a. unsaturated compounds selected from the group consisting of styrene, α-methylstyrene, vinyl-toluene, o-, p- and m-ethylstyrene, tert.-butylstyrene, o-chlorostyrene, 2,4-dichlorostyrene, o-bromostyrene, acrylonitrile, methacrylonitrile, vinyl chloride, vinylidene chloride, vinyl bromide, vinyl acetate, vinyl propionate, vinyl pivalate, esters of acrylic acid, methacrylic acid, itaconic acid, maleic acid, fumaric acid and crotonic acid with aliphatic or cycloaliphatic alcohols of 1 to 10 carbon atoms, lauryl acrylate, lauryl methacrylate, vinyl-glycol, but-2-ene-1,4-diol, butenol, allyl alcohol, esters of acrylic acid, substituted acrylic acids, crotonic acid, fumaric acid and itaconic acid with straight-chain or branched polyhydric alcohols of mean molecular weights from 50 to 6000, in which at least one OH group of the polyhydric alcohol is not esterified, unsaturated copolymerizable polyols with mean molecular weights of from 200 to 6000, acrylamide, methacrylamide, butadiene, isoprene, piperylene and chloroprene, and b. crosslinking agents incorporated in the polymerized form in an amount of from 0.1 to about 20% by weight and selected from the group consisting of divinylbenzene, diallyl maleate, diallyl fumarate, diallyladipate, allyl acrylate, allyl methacrylate, diacrylates and dimethacrylates of polyhydroxyalcohols and butadiene, wherein said homopolymers and copolymers have a glass transition temperature of from 40° to 130° C and said graft polymers have two glass transition temperatures, one of from −40° to 90° C and the other of from 40° to 130° C;

II. removing the water from the mixture to produce a dispersion of 1 to 40% by weight of polymer(s) (C) in 99 to 60% by weight of polyhydroxy compound (B); and III. reacting the resultant mixture of (B) and (C) with an organic polyisocyanate (A) to form the polyurethanes, the ratio of the NCO equivalent of polyisocyanate to radicals of said mixture (B) and (C) which are reactive with isocyanato radicals being in the range of about 0.7–1.3:1.

2. A method as set forth in claim 1 wherein the unsaturated compounds are selected from the group consisting of styrene, acrylonitrile, butadiene, hydroxypropylacrylate, butaediol monacrylate and a reaction product of 1 mole of maleic anhydride and 1 mole of a polyether-polyol based on polypropylene glycol and having a mean molecular weight of 2000 (Reaction product L).

3. A process as set forth in claim 1, wherein the polymer (C) has a glass transition temperature of from 40° C to 130° C.

4. A process as set forth in claim 1, wherein the polymer (C) which is used is a graft polymer which has two glass transition temperatures, of which one is from −40° to −90° C and the other from 40° to 130° C, or is a mixture of this graft polymer with a polymer which has a glass transition temperature of from 40° to 130° C.

5. A process as set forth in claim 1, wherein the organic polyisocyanate is selected from the group consisting of toluylenediisocyanates, mixtures of diphenylmethanediisocyanates and polyphenylpolymethylenepolyisocyanates and mixtures of toluylendiisocyanates with a mixture of diphenylmethanediisocyanates and polyphenylpolymethylenepolyisocyanates.

6. A process as set forth in claim 1, wherein the polyhydroxy compound(s) used are polyether-polyols having a molecular weight of from 500 to 7,000 and a hydroxyl number of from 20 to 150.

7. A process as set forth in claim 1, wherein the crosslinked, particulate polymer(s) (C) have a particle size of from about 1,000 to 2,500 A.

8. A process as set forth in claim 1, wherein the polymer(s) (C) contain from 0.1 to 18% by weight, based on their weight, of a crosslinking agent.

9. A process as set forth in claim 8, wherein the crosslinking agent used is divinylbenzene, a diallyl maleate, a diallyl fumarate, a diallyl adipate, an allyl acrylate, an allyl methacrylate or a diacrylate or dimethacrylate of a polyhydroxyalcohol.

10. A process as set forth in claim 9, wherein the crosslinking agent used is divinylbenzene.

11. A process as set forth in claim 1, wherein the polymer(s) (C) contain at least one hydroxy group which can react with isocyanates.

12. A process as set forth in claim 11, wherein the polymer(s) (C) contain polymerized units of hydroxypropyl acrylate, butanediol monoacrylate or a reaction product of 1 mole of maleic anhydride and 1 mole of polyether-polyol based on polypropylene glycol with a mean molecular weight of 2,000.

13. A process as set forth in claim 1, wherein the polymer(s) (C) are obtained by polymerization of styrene with divinylbenzene or styrene with acrylonitrile and divinylbenzene, the acrylonitrile content being from 0.1 to 50% by weight, based on the weight of styrene and acrylonitrile.

14. A process as set forth in claim 13, wherein the polymer(s) (C) contain, as additional monomers, hydroxypropyl acrylate, butanediol monoacrylate or a reaction product of 1 mole of maleic anhydride and 1 mole of a polyether-polyol based on polypropylene glycol with a mean molecular weight of 2,000.

15. A process as set forth in claim 1, wherein the gel content of polymer(s) (C) is from 15 to 90%.

16. A process as set forth in claim 1 wherein the polyurethane is foamed.

* * * * *

UNITED STATES PATENT AND TRADEMARK OFFICE
CERTIFICATE OF CORRECTION

PATENT NO. : 4,049,590
DATED : September 20, 1977
INVENTOR(S) : Falkenstein et al It is certified that error appears in the above-identified patent and that said Letters Patent are hereby corrected as shown below:

Column 19 line 47, "butaediol" should read --butanediol--

Signed and Sealed this

Eleventh Day of April 1978

[SEAL]

Attest:

RUTH C. MASON
Attesting Officer

LUTRELLE F. PARKER
Acting Commissioner of Patents and Trademarks